United States Patent [19]

Yukimoto et al.

[11] Patent Number: 5,051,463
[45] Date of Patent: Sep. 24, 1991

[54] CURABLE POLYMER COMPOSITION

[75] Inventors: Sadao Yukimoto; Hiroshi Wakabayashi; Katsuhiko Isayama, all of Kobe, Japan

[73] Assignee: Kanegafuchi Chemical Industry Co., Ltd., Osaka, Japan

[21] Appl. No.: 417,133

[22] Filed: Oct. 4, 1989

[30] Foreign Application Priority Data

Oct. 7, 1988 [JP] Japan .................. 63-253996

[51] Int. Cl.$^5$ .................. C08K 5/10; C08L 83/00
[52] U.S. Cl. .................. 524/306; 524/377; 524/378; 524/506; 524/865; 525/104
[58] Field of Search .......... 524/506, 378, 377, 865, 524/306; 525/104

[56] References Cited

U.S. PATENT DOCUMENTS 3,822,654 4/1989 Takemura et al. .......... 525/104
4,153,594 5/1979 Wilson, Jr. .
4,323,488 4/1982 Takago et al. .......... 528/25
4,735,829 4/1988 Hirose et al. .......... 525/104

FOREIGN PATENT DOCUMENTS 264072 4/1988 European Pat. Off. .

Primary Examiner—Joseph L. Schofer
Assistant Examiner—Mark Sweet
Attorney, Agent, or Firm—Armstrong, Nikaido, Marmelstein, Kubovcik & Murray

[57] ABSTRACT

A curable resin composition comprising:
(A) 100 parts by weight of a rubbery organic polymer having at least one silicon-containing group to the silicon atom of which a hydrolyzable group is bonded and which is cross linkable through formation of a siloxane bond in a molecule.
(B) 10 to 500 parts by weight of a vinyl chloride base resin, and
(C) 1 to 150 parts by weight of a polymeric plasticizer, which has improved storage stability and is easily cured in the presence of water.

11 Claims, No Drawings

CURABLE POLYMER COMPOSITION

BACKGROUND OF THE INVENTION

1. Field of the Invention

The present invention relates to a curable polymer composition, and more particularly to a curable polymer composition which has good storage stability and is cured quickly in the presence of water.

2. Description of the Related Art

A curable composition of an organic polymer which has a silicon-containing group to the silicon atom of which a hydrolyzable group is bonded and which is cross linkable through formation of a siloxane bond (hereinafter referred to as a "silicon-containing hydrolyzable group") and can be converted to a rubbery material is known from, for example, Japanese Patent Kokai Publication No. 73998/1977, and such the curable polymer composition is used as a sealant.

The curable polymer composition is supplied in the form of a two pack system or a one pack system. In the two pack system composition, a main component containing the polymer and a curing agent are separately packed and mixed just before use, while in the one pack system composition, the main component and the curing agent are mixed and sealed in the same pack in the absence of water and exposed to the air whereby the mixture absorbs moisture in the air and cures. Although the one pack type composition is preferable in view of its easy handling property, it often suffers from undesirable curing during storage and cannot be used. Then, a curable polymer composition having good storage stability is highly desired.

One of the causes of loss of the storage stability is water contained in inorganic fillers which are added to the curable polymer composition in a comparatively large amount to impart a rubbery properties to the cured material or reduce the cost of the composition. Water contained in the inorganic fillers reacts with the silicon-containing hydrolyzable group during storage to cross link the polymer and makes the composition unusable.

It was found that a curable polymer composition comprising an organic polymer having the silicon-containing hydrolyzable groups and, as a filler, a vinyl chloride base resin has good storage stability, and that, when such resin composition contains a plasticizer, a cured material from such composition has good tensile properties (cf. U.S. patent application Ser. No. 106,300 filed on Oct. 9, 1987 now abandoned and European Patent Application No. 87 114 721.1). However, during storage of the curable polymer composition containing the vinyl chloride base resin tends to be gelled with the plasticizer and therefore the viscosity of the composition is increased, so that the composition cannot be used as the sealant.

SUMMARY OF THE INVENTION

An object of the present invention is to provide a one pack system curable polymer composition which comprises a cross likable organic polymer, a vinyl chloride base resin as a filler and a plasticizer and does not suffer from increase of viscosity due to gelation during storage.

Accordingly, the present invention provides a curable polymer composition comprising:

(A) 100 parts by weight of a rubbery organic polymer having at least one silicon-containing hydrolyzable group in a molecule, (B) 10 to 500 parts by weight of a vinyl chloride base resin, and (C) 1 to 150 parts by weight of a polymeric plasticizer.

DETAILED DESCRIPTION OF THE INVENTION

In the present invention, the rubbery organic polymer having at least one silicon-containing hydrolyzable group in a molecule (hereinafter referred to as "rubbery organic polymer (A)") is intended to mean a rubbery organic polymer having, at molecular ends or on side chains, preferably at the molecular ends, at least one silicon-containing hydrolyzable group, preferably 1.1 to 5 silicon-containing hydrolyzable groups on the average.

The "silicon-containing hydrolyzable group" can form a cross linking through a silanol condensation reaction in the presence of moisture or a cross linking agent optionally in the presence of a catalyst. One of the typical silicon-containing hydrolyzable groups is represented by the formula:

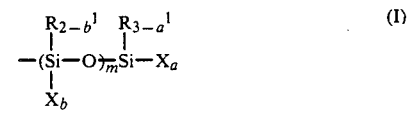

wherein $R^1$ is a monovalent hydrocarbon group having 1 to 20 carbon atoms or a triorganosiloxy group of the formula:

which $R^2$ is a monovalent hydrocarbon group having 1 to 20 carbon atoms provided that three $R^2$ groups may be the same or different and when two or more $R^1$ groups are present, they may be the same or different; X is a hydrolyzable group provided that when two or more X groups are present, they may be the same or different; "a" is 0, 1, 2 or 3, "b" is 0, 1 or 2 provided that the sum of "a" and "mb" is at least 1, preferably from 1 to 4, and "m" is 0 or an integer of 1 to 18.

Specific examples of the monovalent hydrocarbon group $R^1$ are alkyl groups (e.g. methyl, ethyl, etc.), cycloalkyl groups (e.g. cyclohexyl), aryl groups (e.g. phenyl) and aralkyl groups (e.g. benzyl). The hydrocarbon group may be substituted with a substituent such as halogen atoms. Among them, methyl and phenyl are preferred in view of availability of a raw material for the preparation of the rubbery organic polymer (A).

Specific examples of the hydrolyzable group X are a hydrogen atom, a halogen atom, an alkoxy group, an acyloxy group, a ketoximate group, an amino group, an amide group, an aminoxy group, a mercapto group, an alkenyloxy group and the like. Among them, the alkoxy group having 1 to 8 carbon atoms is preferable since it is mildly hydrolyzed and easily handled.

When the number of the silicon-containing hydrolyzable group is less than one per molecule of the rubbery organic polymer (A), the composition is not sufficiently cured. There is no critical upper limit for the number of the silicon-containing hydrolyzable group per molecule of the rubbery organic polymer (A). In view of the tensile properties of the cured material of the composition, not more than five silicon-containing hydrolyzable groups on the average are present per molecule of the rubbery organic polymer (A).

The number of the hydrolyzable groups in the rubbery organic polymer is preferably from 1.1 to 5 per molecule on the average.

The molecular weight of the rubbery organic polymer (A) is not critical, and preferably the number average molecular weight is from 300 to 1,000,000.

The backbone chain of the rubber organic polymer (A) may comprise a polymer such as an alkylene oxide base polymer, an ether-ester block copolymer, a vinyl polymer a vinyl base copolymer, a diene base polymer, and the like.

When the alkylene oxide base polymer is used as the rubbery organic polymer (A), preferably the alkylene oxide base polymer has a backbone chain comprising repeating units of the formula:

$$-R^3-O- \tag{II}$$

wherein $R^3$ is a divalent hydrocarbon group having 1 to 8 carbon atoms, preferably most of the $R^3$ groups are divalent hydrocarbon groups having 1 to 4 carbon atoms.

The amount of the repeating units (II) is preferably at least 50% by weight, more preferably at least 70% by weight, most preferably at least 90% by weight.

Specific examples of the $R^3$ group are $-CH_2-$, $-CH_2CH_2-$, $-CH(CH_3)-CH_2-$, $-CH(C_2H_5)-CH_2-$, $-C(CH_3)_2-CH_2-$, $-CH_2CH_2CH_2CH_2-$, etc. Among them, $-CH(CH_3)-CH_2-$ is preferred.

The alkylene oxide base polymer may comprise one kind of the repeating unit or two or more kinds of the repeating units.

The average molecular weight of the alkylene oxide base polymer is preferably from 300 to 30,000, more preferably from 3,000 to 15,000. The alkylene oxide base polymer having the silicon-containing hydrolyzable groups at the molecular ends and an average molecular weight of 3,000 to 15,000 is most preferred in view of easy handling and good tensile properties of the cured material.

Specific examples of other rubbery organic polymer (A) are polybutadiene, styrene-butadiene copolymer, acrylonitrile-butadiene copolymer, acrylate-butadiene copolymer, ethylene-butadiene copolymer, vinylpyridine-butadiene copolymer, ethylene-propylene copolymer, ethylene vinyl acetate copolymer, ethylene-acrylate copolymer, polyisoprene, styrene-isoprene copolymer, isobutylene-isoprene copolymer, polychloroprene, styrene-chloroprene copolymer, acrylonitrile-chloroprene copolymer, polyisobutylene, polyacrylate and polymethacrylate, in which the silicon-containing hydrolyzable groups are introduced. Among them, the rubbery organic polymer (A) comprising an acrylate or methacrylate, namely the rubbery organic polymer (A) comprising at least 50% by weight of polymerized acrylate or methacrylate is preferred. Specific examples of such polymer are the rubbery organic polymers (A) made from polymers or copolymers comprising at least one ester of (meth)acrylic acid with a straight, branched or cyclic alcohol having 2 to 12 carbon atoms (e.g. n-butyl (meth)acrylate, 2-ethylhexyl (meth)acrylate, ethyl acrylate, propyl acrylate, isobutyl (meth)acrylate, amyl (meth)acrylate, hexyl (meth)acrylate, cyclohexyl (meth)acrylate, n-octyl (meth)acrylate, n-decyl (meth)acrylate, etc.).

The rubbery organic polymer (A) such as the vinyl polymer and the like having the silicon-containing hydrolyzable group has a molecular weight of 300 to 1,000,000, preferably 2,000 to 500,000. When such the rubbery organic polymer (A) has the silicon-containing hydrolyzable groups at the molecular ends, it has particularly a molecular weight of 3,000 to 15,000.

The rubbery organic polymers (A) may be used independently or as a mixture thereof. For example, the above described alkylene oxide base polymer and the vinyl polymer such as polyalkyl acrylate having the silicon-containing hydrolyzable group can be used together. Alternatively, the rubbery organic polymer (A) may be a polymer prepared by polymerizing a vinyl monomer such as an alkyl acrylate in the presence of the above described alkylene oxide base polymer.

The rubbery organic polymer (A) comprising the alkylene oxide base polymer or the ether-ester block copolymer as the backbone chain can be prepared by any one of the methods described in Japanese Patent Publication Nos. 36319/1970, 12154/1971 and 32673/1974 and Japanese Patent Kokai Publication Nos. 156599/1975, 73561/1976, 6096/1979, 13768/1980, 82123/1980, 123620/1980, 125121/1980, 131021/1980, 131022/1980, 135135/1980 and 137129/1980. The rubbery organic polymer (A) comprising the vinyl base polymer or copolymer as the backbone chain can be prepared by any one of the methods described in Japanese Patent Publication No. 28301/1976 and Japanese Patent Kokai Publication No. 179210/1982. The rubbery organic polymer (A) comprising the diene base polymer as the backbone chain can be prepared by any one of the methods described in Japanese Patent Publication No. 17553/1970 and Japanese Patent Kokai Publication No. 1389/1972.

The vinyl chloride base resin (B) to be used according to the present invention may be a homopolymer of vinyl chloride or copolymer of vinyl chloride with at least one other comonomer. Preferably, the copolymer comprises at least 50% by mole of vinyl chloride. Examples of the comonomer to be copolymerized with vinyl chloride are vinyl acetate, vinylidene chloride, acrylic acid, methacrylic acid, acrylate, methacrylate, maleic acid, maleate, acrylonitrile, etc. The average molecular weight of the vinyl chloride base resin (B) is preferably from 200 to 10,000, more preferably from 300 to 4000.

The vinyl chloride base resin (B) may be prepared by any one of the known methods. The vinyl chloride base resin (B) may be a porous one prepared by suspension polymerization having an average particle size of 50 to 200 μm or a so-called vinyl chloride paste resin prepared by emulsion polymerization having an average particle size of 0.01 to 10 μm, preferably 0.02 to 5 μm. Among them, the vinyl chloride paste resin is preferred, since when the vinyl chloride paste resin is used, the cured material from the curable composition of the present invention has better tensile strength than when the vinyl chloride base resin prepared by suspension polymerization is used.

The molecular weight of the polymeric plasticizer (C) is usually from 500 to 15,000, preferably from 1,000 to 10,000. Specific examples of the polymeric plasticizer are polyesters (e.g. a polyester of a dibasic acid with a dihydric alcohol), polyethers (e.g. polypropylene glycol or its derivatives), polystyrenes (e.g. polystyrene or poly-α-methylstyrene), polybutadiene, butadiene-acrylonitrile copolymer, polychloroprene, polyisoprene, polybutene, hydrogenated polybutene, etc. Among them, the polyesters, the polyethers, the polystyrenes, polybutadiene and polybutene are preferred in view of their desirable compatibility and viscosity. The polymeric plasticizers may be used independently or as a mixture thereof. The polymeric plasticizer may be added to a medium in which the rubbery organic polymer (A) is prepared.

The amount of the vinyl chloride base resin (B) is usually from 10 to 500 parts by weight, preferably from 50 to 300 parts by weight per 100 parts by weight of the rubbery organic polymer (A). When the amount of the vinyl chloride base resin (B) is less than 10 parts by weight, the effect of the use of filler is not sufficiently achieved. When said amount is more than 500 parts, the mechanical properties of the cured material are deteriorated.

The amount of the polymeric plasticizer (C) is usually from 1 to 150 parts by weight, preferably from 10 to 120 parts by weight, more preferably from 20 to 100 parts by weight per 100 parts by weight of the rubbery organic polymer (A). When the amount of the polymeric plasticizer (C) is less than 1 part by weight, no plasticizing effect is obtained. When said amount is more than 150 parts by weight, the mechanical properties of the cured material are deteriorated.

The curable polymer composition of the present invention may additionally contain a filler other than the vinyl chloride base resin (B), a plasticizer other than the polymeric plasticizer, a solvent, a conventional additive, a curing catalyst and the like.

Examples of the other filler are calcium carbonate, kaolin, talc, magnesium carbonate, aluminum silicate, titanium oxide, zinc oxide, iron oxide, asbestos, glass powder, carbon black and the like.

The plasticizer other than the polymeric plasticizer (C) may be used in such an amount that the objects of the present invention can be achieved. Examples of such other plasticizer are phthalates (e.g. dibutyl phthalate, diheptyl phthalate, di(2-ethylhexyl) phthalate, di-n-octyl phthalate, butylbenzyl phthalate, butylphthalylbutyl glycolate, etc.), esters of non-aromatic dibasic acids (e.g. dioctyl adipate, dioctyl sebacate, etc.), esters of polyalkyleneglycols (e.g. diethylene glycol dibenzoate, triethylene glycol dibenzoate, etc.), phosphates (e.g. tricresyl phosphate, tributyl phosphate, etc.), epoxidized soy bean oil, and the like.

Examples of the solvent are aromatic hydrocarbon type solvents (e.g. xylene, toluene, etc.) and lower alcohols (e.g. methanol, ethanol, etc.).

Examples of the other additives are resins other than vinyl resins (e.g. epoxy resins, phenol resins, etc.); adhesion imparting materials such as silane coupling agents having a functional group (e.g. γ-propyltrimethoxysilane, γ-mercaptopropyltrimethoxysilane, γ-mercaptopropylmethyldimethoxysilane, γ-glycidoxypropyltrimethoxysilane, N-(β-aminoethyl)aminopropylmethyldimethoxysilane, etc.), alkyl titanates and aromatic polyisocyanates; anti-sagging agents such as hydrogenated castor oil, organic bentonite and metal soaps; UV light absorbers; anti-aging agents; colorants; and the like.

Examples of the curing catalyst are titanates (e.g. tetrabutyl titanate, tetrapropyl titanate, etc.), organic tin compounds (e.g. dibutyltin dilaurate, dibutyltin maleate, dibutyltin diacetate, tin octylate, tin naphthenate), lead octylate, amines (e.g. butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 1,8-diazabicyclo[5.4.0]undecene-7 (DBU), etc.) or their salts with carboxylic acids. They may be used independently or as a mixture.

Since the curable polymer composition of the present invention hardly suffers from increase of viscosity during storage, its handling property as the sealant is not deteriorated.

The curable polymer composition of the present invention can be used not only as the sealant but also an adhesive, a templating material, a vibration insulator, a foaming agent, etc.

PREFERRED EMBODIMENTS OF THE INVENTION

The present invention will be illustrated by following Examples, in which "parts" are by weight unless otherwise indicated.

EXAMPLES 1-3

Polypropyleneoxide 80% of the terminal groups of which were groups of the formula:

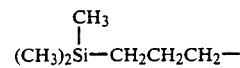

(average molecular weight of 8,000) as the rubbery organic polymer (A), a polymeric plasticizer I, II or III, calcium carbonate (Shiroenka CCR manufactured by Shiraishi Industries Co., Ltd., which has an average particle size of 0.08 μm), titanium dioxide (pigment), an anti-aging agent (Noklack NS-6 manufactured by Ouchi Sinko Chemical Co. Ltd.) and hydrogenated castor oil (Deipairon, an anti-sagging agent manufactured by Kusumoto Chemical Co., Ltd.) were mixed in amounts indicated in Table and kneaded at 120° C. under reduced pressure of 10 mmHg for 3 hours while dehydration. After cooling to room temperature, to the mixture, a vinyl chloride paste resin (PSH-10 manufactured by Kanegafuchi Chemical Industry Co., Ltd., which has an average polymerization degree of 1,700 and an average particle size of about 1 μm) in an amount indicated in Table was added and kneaded at room temperature for 2 hours. Finally, N-(β-aminoethyl)-γ-aminopropyltrimethoxysilane (A-1120 manufactured by Nippon Unicar, Ltd.) as an adhesion imparting agent and a tin base curing catalyst (No. 918 manufactured by Sankyo Organic Synthetic Co., Ltd.) as a curing catalyst were added in amounts indicated in Table, followed by further kneading to prepare a paste-like composition.

The paste-like composition was charged in a sealed container and stored in a thermostatic chamber kept at 50° C. for one month. Then, the composition was removed from the container and its viscosity was measured with a BS type viscometer (manufactured by Kabushikikaisha Tokyo Keiki, rotor No. 7, number of revolution of 2 rpm) to evaluate the storage stability. The results are shown in Table.

The polymeric plasticizer I was polyoxypropylene both molecular end of which were the allyl ether groups and which had a number average molecular weight Mn of 6,000 and Mw/Mn of 2.1 according to gel permeation chromatography, the polymeric plasticizer II was polyoxypropylene glycol having a molecular weight of about 5100 (Excenol 5030 manufactured by Asahi Glass), and the polymeric plasticizer III was a polyoxypropylene glycol having a molecular weight of about 3,000 (D 10 L 3000 manufactured by Mitsui Nisso Urethane).

COMPARATIVE EXAMPLES 1 AND 2

In the same manner as in Examples 1-3 but using a monomeric plasticizer (dioctyl phthalate, "DOP"), the curable composition was prepared and its storage stability was evaluated. The results are shown in Table.

TABLE

| Example No. | 1 | 2 | 3 | C. 1 | C. 2 |
|---|---|---|---|---|---|
| Composition (parts) | | | | | |
| Rubbery organic polymer (A) | 100 | 100 | 100 | 100 | 100 |
| Fillers | | | | | |
| Vinyl chloride paste resin | 80 | 80 | 80 | 80 | 80 |
| Calcium carbonate | 60 | 60 | 60 | 60 | 60 |
| Predrying of fillers*1 | No | No | No | No | Yes |
| Plasticizer | I | II | III | DOP | DOP |
| | 60 | 60 | 60 | 60 | 60 |
| Titanium dioxide | 10 | 10 | 10 | 10 | 10 |
| Hydrogenated castor oil | 4 | 4 | 4 | 4 | 4 |
| Anti-aging agent | 0.5 | 0.5 | 0.5 | 0.5 | 0.5 |
| Adhesion imparting agent | 3.0 | 3.0 | 3.0 | 3.0 | 3.0 |
| Curing catalyst | 3.0 | 3.0 | 3.0 | 3.0 | 3.0 |
| Viscosity change (poise) | | | | | |
| Original | 12900 | 11000 | 9800 | 9400 | 9350 |
| After storage | 15500 | 14300 | 10200 | Gelled | |

Note:
*1Predrying was done at 120 under pressure of 10 mmHg for 5 hours.

What is claimed is:

1. A curable polymer composition comprising:
   (A) A rubbery organic polymer having at least one silicon-containing hydrolyzable group bonded to the rubbery organic polymer, said silicon-containing hydrolyzable group being cross linkable through formation of a siloxane bond in a molecule,
   (B) 10 to 500 parts by weight of a vinyl chloride base resin based on 100 parts by weight of the rubbery organic polymer, and
   (C) 1 to 150 parts by weight of a polymeric plasticizer based on 100 parts by weight of the rubbery organic polymer, wherein said polymeric plasticizer has a number average molecular weight of 500 to 15,000 and is at least one member selected from the group consisting of polyesters, polyethers, polystyrenes, polybutadiene and polybutene.

2. The curable polymer composition according to claim 1, wherein the silicon-containing group hydrolyzable is represented by the formula:

$$-(\underset{X_b}{\underset{|}{\overset{R_{2-b}^1}{\overset{|}{Si}}}}-O)_{\overline{m}}\overset{R_{3-a}^1}{\underset{|}{Si}}-X_a \qquad (I)$$

wherein $R^1$ is a monovalent hydrocarbon group having 1 to 20 carbon atoms or a triorganosiloxy group of the formula:

$$R_3^2Si-O-$$

in which $R^2$ is a monovalent hydrocarbon group having 1 to 20 carbon atoms provided that three $R^2$ groups may be the same or different and when two or more $R^1$ groups are present, they may be the same or different; X is a hydrolyzable group provided that when two or more X groups are present, they may be the same or different; "a" is 0, 1, 2 or 3, "b" is 0, 1 or 2 provided that the sum of "a" and "mb" is at least 1, and "m" is 0 or an integer of 1 to 18.

3. The curable polymer composition according to claim 2, wherein the hydrolyzable group X is selected from the group consisting of a hydrogen atom, a halogen atom, an alkoxy group, an acyloxy group, a ketoximate group, an amino group, an amide group, an aminoxy group, a mercapto group and an alkenyloxy group.

4. The curable polymer composition according to claim 1, wherein the number of the silicon-containing hydrolyzable group per molecule is from 1.1 to 5 on the average.

5. The curable polymer composition according to claim 1, wherein the rubbery organic polymer (A) has a number average molecular weight of from 300 to 1,000,000.

6. The curable polymer composition according to claim 1, wherein the rubbery organic polymer (A) comprises an alkylene oxide base polymer as a backbone chain.

7. The curable polymer composition according to claim 6, wherein the alkylene oxide base polymer is polypropylene oxide.

8. The curable polymer composition according to claim 1, wherein the vinyl chloride base resin (B) is a vinyl chloride paste resin.

9. The curable polymer composition according to claim 1, wherein the polymeric plasticizer has a number average molecular weight of from 1,000 to 10,000.

10. The curable polymer composition according to claim 1, wherein the polymeric plasticizer is a polyester.

11. The curable polymer composition according to claim 1, wherein the polymeric plasticizer is a polyether.

* * * * *